United States Patent Office 3,459,800
Patented Aug. 5, 1969

3,459,800
PHENOLSULFONIC ACID DERIVATIVES OF TETRACYCLINE ANTIBIOTICS
Carlos Ferrer Salat, Jorge Ferrer Batlle, and Juan Colome Riera, all of 304 calle Diputacion, Barcelona, Spain
No Drawing. Filed Aug. 3, 1965, Ser. No. 477,032
Claims priority, application Spain, Aug. 8, 1964, 302,954
Int. Cl. C07c *143/46, 143/42*
U.S. Cl. 260—559
7 Claims

ABSTRACT OF THE DISCLOSURE

Phenolsulfonic acid derivatives of tetracycline antibiotics are disclosed. The compounds are of particular usefulness in the treatment of infections of the respiratory tract.

---

The present invention relates to a method of manufacturing new tetracycline derivatives of important therapeutic usefulness.

Tetracycline, which has a broad antibiotic spectrum, acts against cocci, gram-positive bacilli, numerous gram-negative bacteria, Rickettsia and related virus. The insolubility of the tetracycline base led to the clinical use in the form of its hydrochloride as it was more soluble and stable. But this derivative produces a very low pH in such a way that, when administered parenterally, upon getting into contact with physiologic liquids of neutral pH, they provoke insolubilization of the base with irritation or necrosis of the muscular tissues at the point of injection of the preparation. Thus, since it is histolytic, it is unsuitable for parenteral administration.

When administered orally, the precipitation of tetracycline in the duodenum provokes a local irritating effect, inhibits certain pancreatic enzymes, lipase and amylase, and alters the intestinal flora, these facts provoking the side manifestations of the digestive system such as vomiting, nausea, gastritis, diarrhea, etc. It also can give rise to serious complications of the digestive tract due to infections by tetracycline-resistant cocci or by fungi, etc., which even can lead to a choleriform syndrome.

It is therefore of utmost interest to avoid occurrence of these side effects, and to this end numerous experiments have been made administering tetracycline with various substances, to promote its absorption in the upper parts of the digestive tract thus increasing the power of diffusion.

Among the experiments made with the joint administration of substances that increase absorption of tetracycline we can mention that of Kaplan et al. (1957), who associate tetracycline with phosphates and glucosamine, and that of Einer et al (1953) who associate it with citric, malic, malonic, tartaric, etc. acids.

New salts or substituted derivatives in the carboxamide group have been prepared more recently to obtain better absorption and higher blood levels with diminution of side effects, such as tetracycline-pyrrolidine, tetracycline-lysine, etc.

All of these investigations only aim at modifying the physicochemical characteristics without alteration of the therapeutic effect.

In chronic bronchitis there is an inflammatory state in the bronchial mucosa with hyperactivity of the muciparous glands which are responsible for the clinical manifestations of cough, expectoration, etc., and promote bacterial superinfection and reaggravation of the disease. These onsets impair the integrity of the pulmonary tissue provoking irreversible anatomic lesions, and lead progressively to a worsening of the cardiorespiratory picture and to actual cardiac insufficiency.

In such forms of chronic bronchitis, administration of tetracycline for a protracted time of 3 to 6 months—as tetracycline is the best tolerated broad spectrum antibiotic and provides higher effectiveness against numerous germs—has achieved an improvement of the clinical symptomatology and a substantial reduction of the exacerbations and superadded infections responsible for the progressive impairment of the cardiorespiratory condition.

Other broad-spectrum antibiotics are not recommended in these protracted treatments, due to their lower tolerance and the importance of their side effects which are often serious.

On the other hand, in such bronchopulmonary affections tetracycline acts against the microbial agents causing the relapses and exacerbations, but it has no effect in inflammatory states of the mucosa responsible for the general symptoms: cough, expectoration, dyspnea, etc.

Hence we directed our investigations towards a search for a tetracycline derivative that would provide a specific medicament for the treatment of these affections, acute and chronic, of the respiratory tract, which would improve simultaneously the solubility, absorption and tolerance of tetracycline, and for this reason were started the studies of balsamic derivatives, our attention being centralized on guaiacol and thymol.

The introduction of a sulfonic group in the gauiacol provided a group that would react with tetracycline while it enabled at the same time to preserve the respective balsamic and bactericidal action and also to increase the tolerance of guaiacol.

Thus we had a product that, because it joined a balsamic and an antibiotic action, acts synergistically and is extraordinarily effective in the affections of the respiratory system.

These compounds are therefore particularly indicated in the affections of the respiratory system, whether pulmonary or bronchial or of the upper respiratory tract, otitis, pharyngitis, etc., and in the affections of the kidneys and urinary tract.

The production process is fundamentally based on reacting the —$SO_3H$ group of guaiacolsulfonic acid with the $(CH_3)_2N$— of the tetracycline and formation of an ammonium compound. With this same process is obtained also the tetracycline thymolsulfonate.

The compound can be obtained either by direct reaction of guaiacolsulfonic acid and tetracycline in a suitable solvent, and elimination of the latter by evaporation or, since these products are not available in the market in the free form but in the form of salts, starting from these salts.

Hence the reaction is based fundamentally on the insolubilization of the inorganic salt formed which can be achieved by choosing a suitable solvent such as water, methyl alcohol, ethyl alcohol, etc.

Whenever the guaiacolsulfonic acid is mentioned in the present description, it must be understood that we refer to all possible isomers of the guaiacolsulfonic acid and also to the mixture of same.

As an illustration we give the following examples which refer to possible ways of making the compounds of the invention.

EXAMPLE A

One mol of tetracycline base is treated with the equivalent quantity of sulfuric acid (49 g.) in 2% aqueous solution. To the solution is added the equivalent amount of calcium guaiacolsulfonate in 5% aqueous solution. This addition is done slowly and under stirring to prevent the $CaSO_4$ crystals formed thereby from occluding the particles of the remaining components.

Stirring continues for half an hour and the reaction mixtures is then immediately concentrated in vacuum at a temeprature not over 40° C. to a volume of 1 liter.

Thereafter, 2 liters of pure ethyl alcohol are added and the thus-formed mixture cooled at 15° C. to precipitate the CaSO₄ completely. The thus formed precipitate is removed by filtration and the filtrate is vacuum evaporated at a temperature not over 40° C. obtaining as a final result 630 g. of tetracycline guaiacolsulfonate.

EXAMPLE B 0.5 mol of calcium guaiacolsulfonate (224 g.) are dissolved in 1 liter of pure ethyl alcohol and treated with 0.5 mol of pure sulfuric acid. The reaction mixture is then concentrated in vacuum at 40° C., the calcium sulfate formed thereby is filtered off and an aliquot part of the guaiacolsulfonic acid formed remains in the solution.

To one mol of tetracycline base (or oxytetracycline or chlortetracycline) suspended in 1.5 liters alcohol the equivalent amount of the solution of guaiacolsulfonic acid is added and heated moderately to complete dissolution.

The volume is reduced by one half by vacuum evaporation and the thus concentrated solution treated with two liters of anhydrous ether which precipitate the product. Cool at 0° and filtrate washing three or four times with ether up to a volume of 500 cc.

By vacuum drying at low temperature, 632 g. of tetracycline guaiacolsulfonate are obtained (or oxytetracycline or chlortetracycline guaiacolsulfonate, according to the initial product one starts from.

EXAMPLE C

Dissolve 5 g. potassium thymolsulfonate in 15 cc. methyl alcohol adding the stoichiometric quantity of concentrated sulfuric acid.

Heat at 55° C. for 5 minutes, allow to cool, filter the precipitate of the potassium sulfate formed and wash with methyl alcohol. Evaluate an aliquot part of the filtrate with NaOH 1 N using methyl orange as indicator. Add to the remainder of the solution the corresponding amount of tetracycline at the rate of 0.444 g. teracycline bases per cc. of NaOH required.

Heat slightly without exceeding 50° C. for 15 minutes and eliminate immediately the alcohol by vacuum evaporation.

The resulting product is washed with ether and vacuum dried.

The compounds obtained have the following characteristics.

Tetracycline guaiacolsulfonate

Yellow crystalline powder, souble in water and ethanol, insoluble in ether, whose empirical formula is $$C_{29}H_{32}O_{13}SN_2$$

and whose structural formula is:

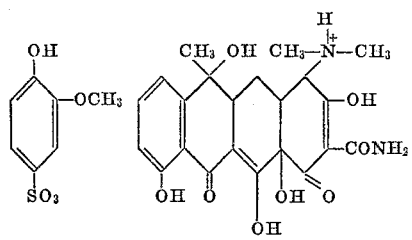

of molecular weight 648.62 and melting point 190° C.

The absorption spectrum in ultraviolet light in aqueous solution yields two well defined maxima at 276 mμ and 360 mμ and two minima at 255 mμ and 323 mμ.

Tetracycline thymolsulfonate

Solid, crystalline, soluble in ethanol, slightly soluble in benzene and insoluble in ether, of empirical formula $C_{32}H_{38}O_{12}SN_2$ and of structural formula:

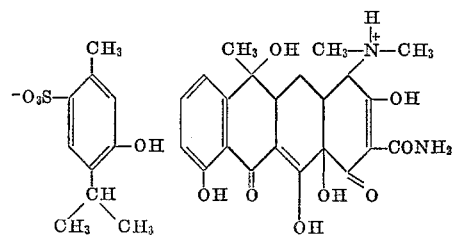

of melting point 195° C.

Oxytetracycline guaiacolsulfonate

Of empirical formula $C_{29}H_{32}O_{14}SN_2$ and of structural formula:

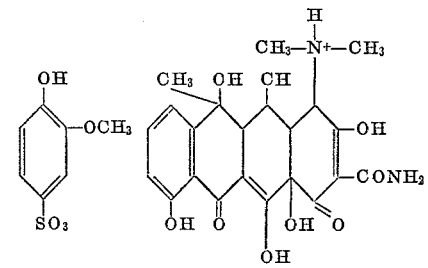

Chlorotetracycline guaiacolsulfonate

Of empirical formula $C_{29}H_{31}O_{13}SN_2Cl$ and structural formula:

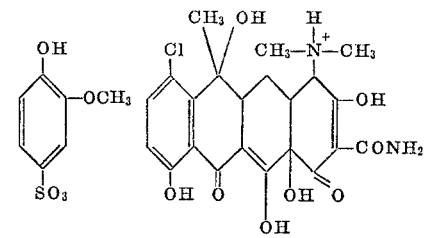

The products thus obtained are entirely original compounds not only by their composition but also by their therapeutic effect.

For instance, the tetracycline guaiacolsulfonate achieves a synergism between an antibiotic action and an antiphlogistic action of the mucosa of the respiratory system diminishing the bronchial secretions. This renders the tetracycline guaiacolsulfonate the antibiotic intended for acute diseases of the respiratory system and in chronic affections, since it shows a higher effect than any other drug according to the clinical results obtained.

In order to establish the therapeutical value of the drug, a series of pharmacological tests have been conducted an animals; cats, rats, etc., and also a series of microbiologic tests.

The $LD_{50}$ in rats, by oral way, of tetracycline guaiacolsulfonate administered by sound, is 4.4±0.3552 g./kg., against the 3 g./kg. value of tetracycline according to Cunningham et al. (Antibiotics Annual 1953–54, 63). The chronic toxicity in rats has been determined too. A group of rats with an average weight of 103 g. were administered 400 mg./kg. of tetracycline guaiacolsulfonate daily for two months, which were compared with a control lot, and all animals were submitted to the same diet.

Hematologic examination was made before and after the experience, and pathological-anatomical examination and histologic examination of liver, kidneys, suprarenals, heart, lungs and intestines after the test. All examinations show that there are no noticeable differences between the group of the treated animals and that of the control animals.

The weight curve has also been determined, and even though there was a certain difference between the group of treated animals and the group of control animals, same is of little significance and may be ascribed to hazard.

Determination was made of the distribution in the organism of tetracycline guaiacolsulfonate in rats at the dose of 200 mg. of tetracycline base administered by oral route using the Wood's light technique. The experiments showed the quick distribution of the product through the whole organism as well as a long permanence in same.

Administered intravenously to a cat at the dose of 30 mg./kg. is was verified that it does not exert any worth mentioning alteration.

Respiration and arterial pressure are not altered. The cardiac rhythm and the cardiogram remain normal. It has no action on the activity and the tonus of the smooth musculature.

In order to determine the possible loss of activity of tetracycline upon combining with guaiacolsulfonic acid, the activity of the product has been compared with tetracycline hydrochloride as a standard and the microbiologic assays made with *Bactillus cereus* var. mycoids (A.T.C.C. 9634) by cylinder-plate diffusion method show an activity of 690 microgram per mg. Since tetracycline guaiacolsulfonate contains 68.4% of tetracycline, there is no loss of activity.

In the light of the pharmacological results obtained and verified further in human clinics, it is obvious that tetracycline guaiacolsulfonate is a product of extraordinary therapeutic value characterized by its great power of diffusion, long permanence in the organism, high tolerance and lack of noticeable untoward side effects.

The drug can be administered in the usual pharmaceutical forms such as coated tablets, syrups, suppositories, etc., alone or associated with other drugs, since the test made with this new drug, prepared in the mentioned pharmaceutic forms, do not show any noticeable loss of activity.

We claim:

1. A composition of matter having the following formula:

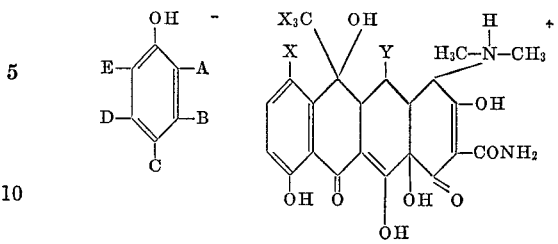

wherein X is hydrogen or chlorine if Y is hydrogen and wherein X is hydrogen if Y is OH, and wherein A is —$OCH_3$ or is hydrogen with the proviso that:

(I) if A is —$OCH_3$, then B and E are hydrogen and one of the two radicals designated C and D is $SO_3^-$ and the other is hydrogen, and (II) if A is hydrogen, then B is methyl, C is $SO_3^-$, D is hydrogen and E is isopropyl.

2. Tetracycline guaiacolsulfonate.
3. Oxytetracycline guaiacolsulfonate.
4. Chlorotetracycline guaiacolsulfonate.
5. Tetracycline thymolsulfonate.
6. Oxytetracycline thymolsulfonate.
7. Chlorotetracycline thymolsulfonate.

References Cited

UNITED STATES PATENTS 3,242,235   3/1966   Riffkin et al.

ALEX MAZEL, Primary Examiner

A. M. TIGHE, Assistant Examiner

U.S. Cl. X.R.

424—227